United States Patent [19]
Satou

[11] Patent Number: 5,291,390
[45] Date of Patent: Mar. 1, 1994

[54] CONTROL APPARATUS FOR MECHANICAL DEVICES WHICH REGULATES CONTROL SYSTEM OPERATION SPEED TO PREVENT HUNTING AND OVERSHOOTING AND THEREBY OPTIMIZES THE CONTROL SIGNAL

[76] Inventor: Nobuyasu Satou, 11-3-501, Minamifujisawa, Fujisawa-shi, Kanagawa-ken, Japan

[21] Appl. No.: 826,572

[22] Filed: Jan. 27, 1992

[30] Foreign Application Priority Data

Apr. 30, 1991 [JP] Japan .................. 3-124661

[51] Int. Cl.$^5$ ............................. G05B 13/02
[52] U.S. Cl. .................... 364/148; 364/162
[58] Field of Search ............... 364/148, 158, 161–163

[56] References Cited

U.S. PATENT DOCUMENTS

| | | | |
|---|---|---|---|
| 5,057,993 | 10/1991 | Kanda | 364/162 |
| 5,122,963 | 6/1992 | Chen | 364/471 |
| 5,175,678 | 12/1992 | Frerichs et al. | 364/148 |

FOREIGN PATENT DOCUMENTS

59-90103  5/1984  Japan .................. 364/148

OTHER PUBLICATIONS

ISA Transactions, vol. 16, No. 4, 1977, Pittsburgh, US, pp. 59–67, D. Etchard: Forecasting and Compensating the Effects of Deadtime on a Commonly Applied Chemical Pacing Control Loop.

Automatisierungstechnik–AT, vol. 35, No. 11, 1987, Muenchen, DE, pp. 464–465, A. Glattfelder et al.: Zum Fuehrungsverhalten von PID-ARW-Eingroessenkreisen.

Primary Examiner—Jerry Smith
Assistant Examiner—Cameron H. Tousi
Attorney, Agent, or Firm—Kenyon & Kenyon

[57] ABSTRACT

A control apparatus for a mechanical device includes a control element for receiving a reference input signal and supplying an operating signal to the mechanical device, a main feedback element for detecting the control signal and supplying the detected control signal to the control element, and an auxiliary feedback element for detecting the operating signal to be supplied to the mechanical element and supplying the detected operating signal to the control element. The control element produces the operating signal based on the reference input signal, the control signal supplied from the main feedback element, and the operating signal supplied from the auxiliary feedback element to regulate the control speed such that hunting in the control apparatus does not occur.

4 Claims, 16 Drawing Sheets

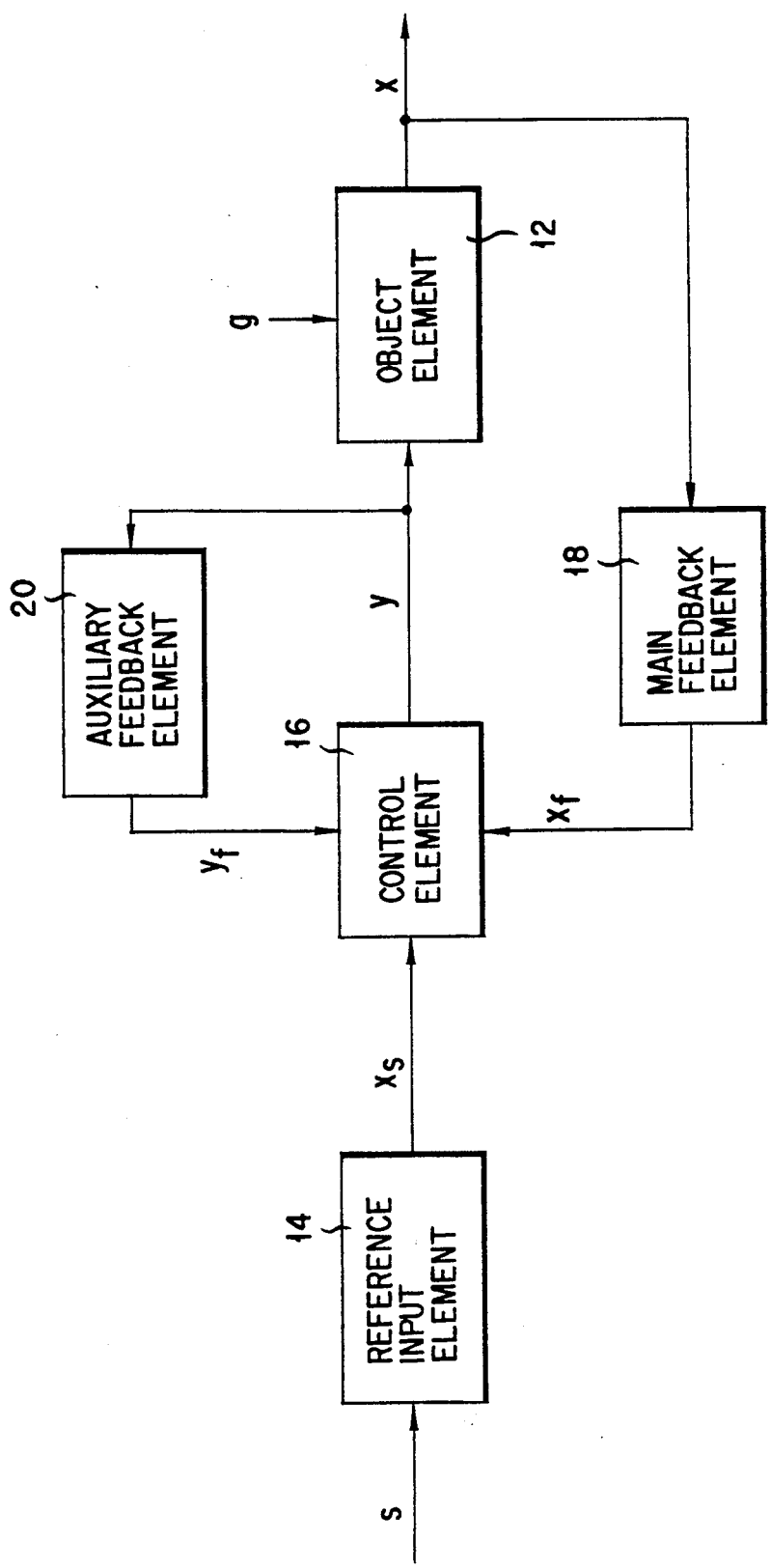
F I G. 2

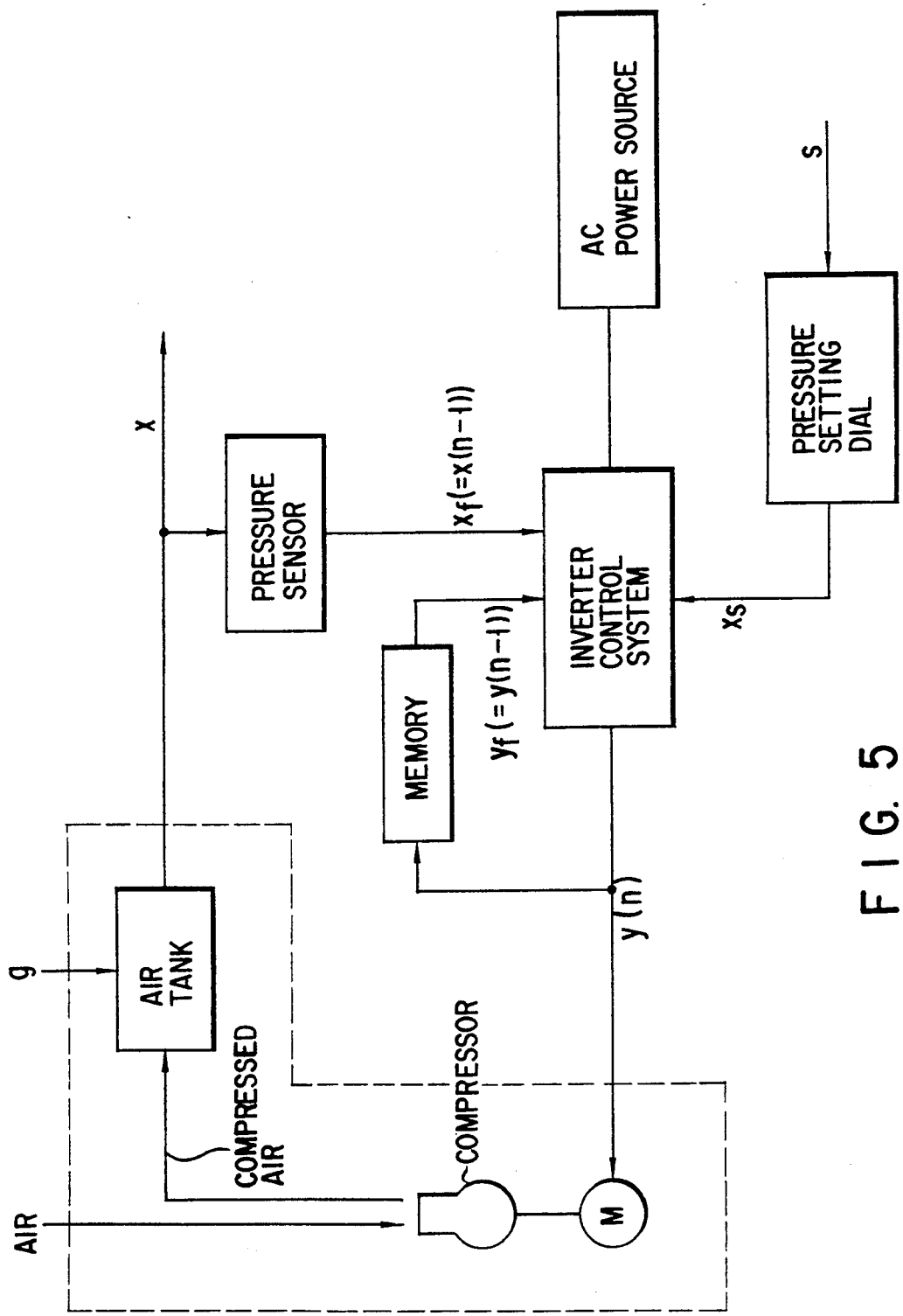
F I G. 5

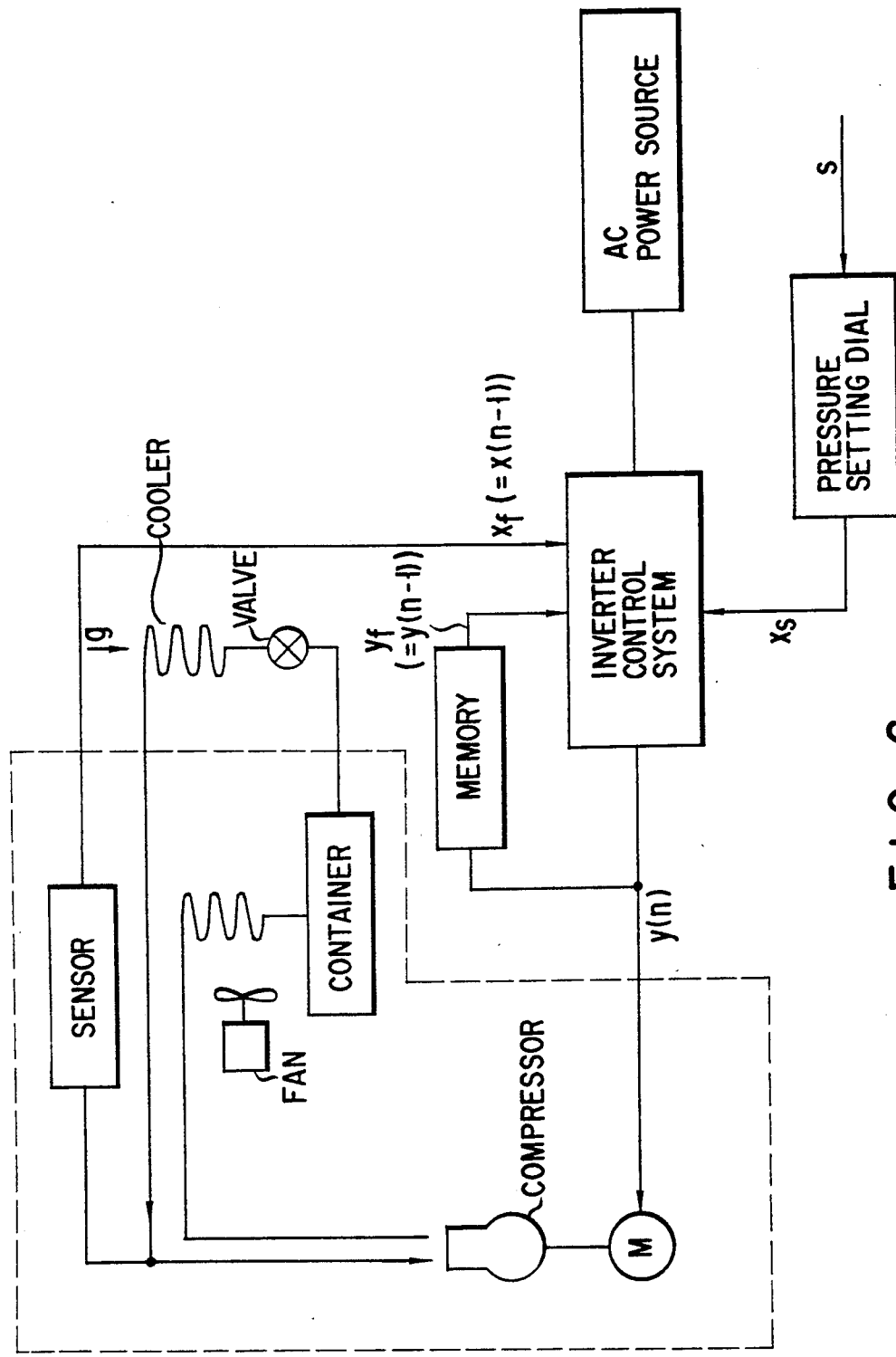
F I G. 6

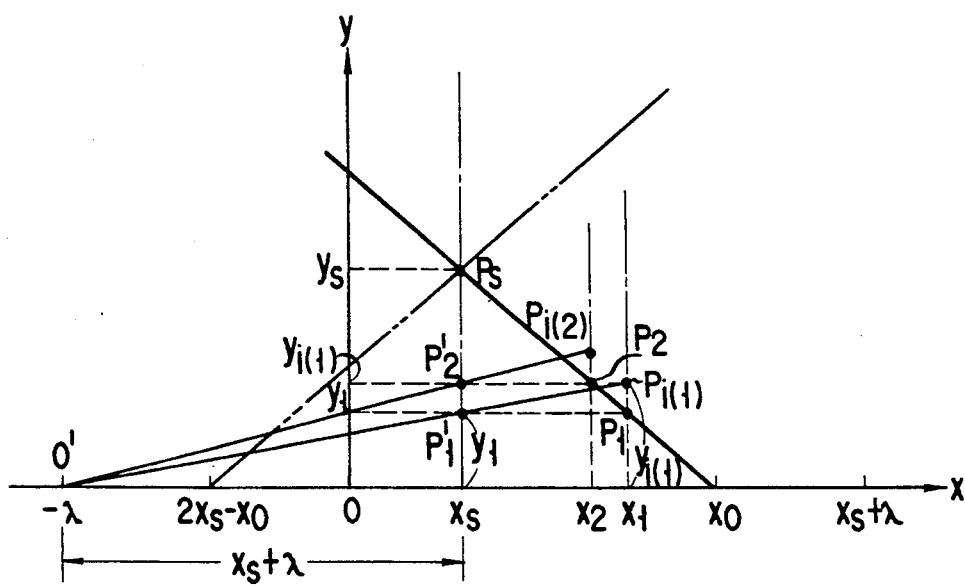
F I G. 16
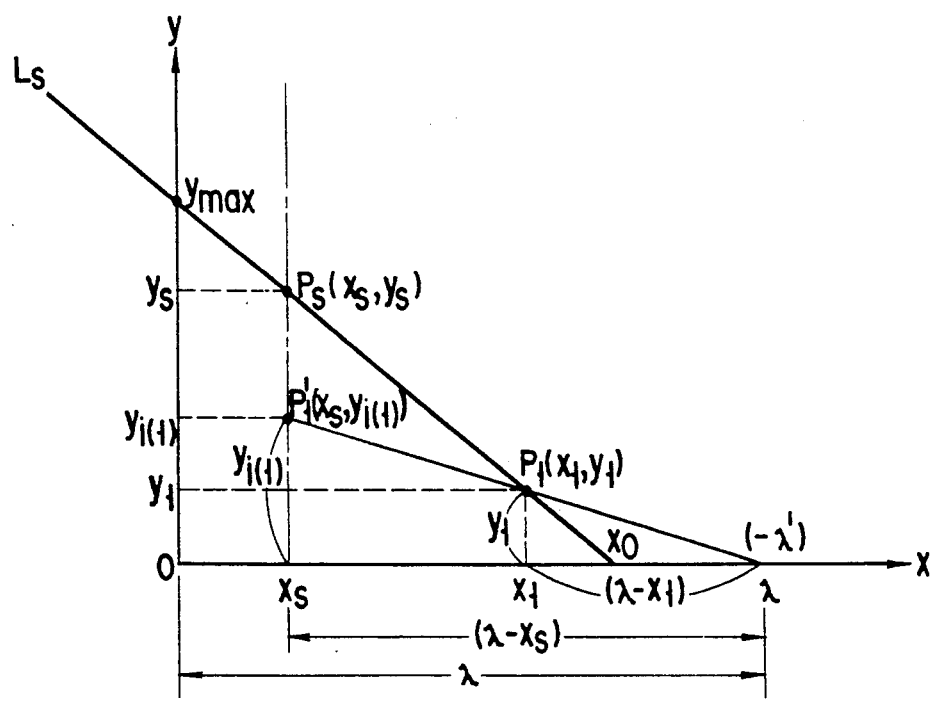
F I G. 17

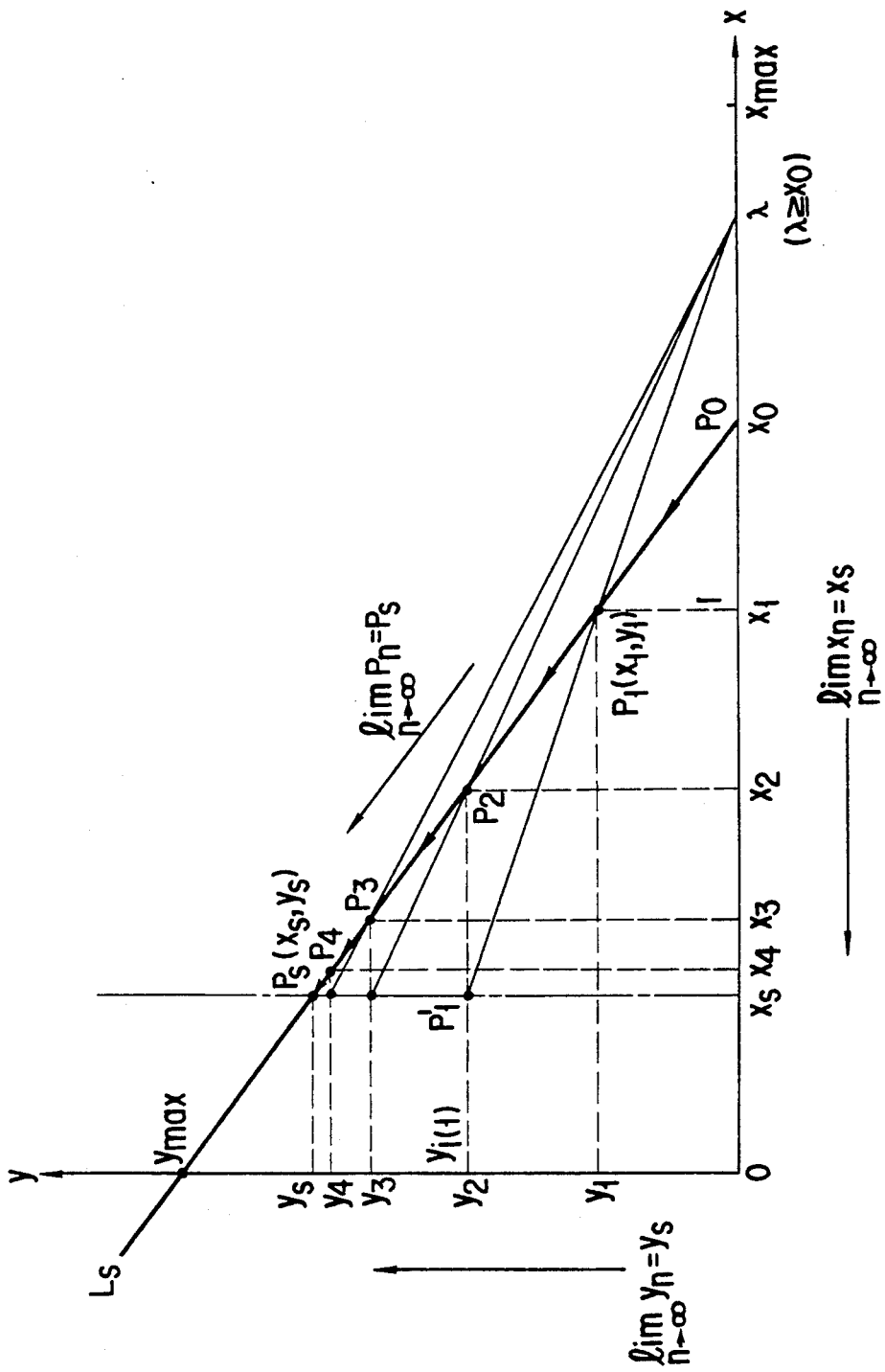
F I G. 18

CONTROL APPARATUS FOR MECHANICAL DEVICES WHICH REGULATES CONTROL SYSTEM OPERATION SPEED TO PREVENT HUNTING AND OVERSHOOTING AND THEREBY OPTIMIZES THE CONTROL SIGNAL

BACKGROUND OF THE INVENTION

1. Field of the Invention

The present invention relates to an apparatus for controlling a variety of different mechanical devices.

2. Description of the Related Art

One example of the control apparatuses of the above type is a proportional-integral-differential (hereinafter referred to as a PID) process control apparatus. The PID control apparatus is probably the most widely used conventional machine control device since it can be applied to a variety of different mechanical devices.

FIG. 1 is a block diagram illustrating a conventional PID control apparatus. In the conventional apparatus, a reference signal S of a control signal of an object element 2 is supplied to a reference input element 4. The reference input element 4 supplies a reference input signal $x_s$ to a noninverting input terminal of a subtracter 6. The control signal x output from the object element 2 is supplied to an inverting input terminal of the subtracter 2 through a feedback element 8, as a feedback signal $x_f$. The subtracter 2 supplies a deviation signal $x_s - x_f$ to a PID control element 10. The PID control element 10 calculates an operating signal y in accordance with the known PID algorithm using the deviation signal. The control signal x of the object element 10 is controlled by the operating signal y. The object element 2 is also supplied with a disturbance signal g.

The PID control is suitable for maintaining a constant value. Therefore, the PID control is frequently used as a method of process control.

In recent years, due to the rapid development in electronics, the PID control apparatus has been developed as an auto-tuning digital PID control apparatus. The auto-tuning digital PID control apparatus can automatically set the PID constants (proportional gain, integration time, and differentiating time) in accordance with the control characteristics of the control target object and can control the control target object with a very high accuracy.

However, it has been shown that such a sophisticated control apparatus is not suitable as a means of follow-up control in which the reference value of the control signal is continuously changed. This is because that the PID control apparatus uses as its input data source only the deviation signal $x_s - x_f$ and does not therefore incorporate any technique for modification of the amplitude of the proportional gain in order to prevent overshoot and hunting. Therefore, overshoot and hunting of the control signal may occur during the PID control operation due to this limitation.

Furthermore, sharp variations in the reference signal and the disturbance correspond to a frequency response in the high frequency range. Therefore, it is necessary to provide for gain and phase adjustments. These measures must be designed for the respective control apparatuses. Therefore, it is not possible to commonly apply the same control apparatus to a variety of objects.

SUMMARY OF THE INVENTION

Accordingly, the present invention is designed to overcome the problems inherent in existing prior techniques by providing a control apparatus for mechanical devices which calculates an optimum control signal for preventing the control system from being the source of hunting and overshooting and can control or regulate the operational speed of the control system.

According to one aspect of the present invention, there is provided a control apparatus comprising input means for receiving a reference signal of a control signal of an apparatus, main feedback means for detecting the control signal of the apparatus, auxiliary feedback means for detecting an operating signal which is supplied to the apparatus to control the control signal, and means for producing the operating signal in accordance with the reference signal received by the input means, the control signal detected by the main feedback means, and the operating signal detected by the auxiliary feedback means.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a block diagram showing an embodiment of the control apparatus according to the present invention;

FIG. 5 illustrates an example of a control target device having a direct characteristic;

FIG. 6 illustrates an example of a control target device having an inverse characteristic;

FIG. 16 illustrates the operation based on formula (21) using the initial point $x = -\lambda$ which is a point obtained by regressing the fiducial point in FIG. 14 along the x axis to a point which is symmetrical with respect to an axis $x = x_s$;

FIG. 17 illustrates the virtual operating value $y_{i(1)}$ calculated in accordance with formula (22);

FIG. 18 illustrates the simultaneous convergence to a point $P_s$ in accordance with formula (22) where $y_{i(n-1)} = y_n$;

DETAILED DESCRIPTION OF THE PREFERRED EMBODIMENTS

Figure 1:
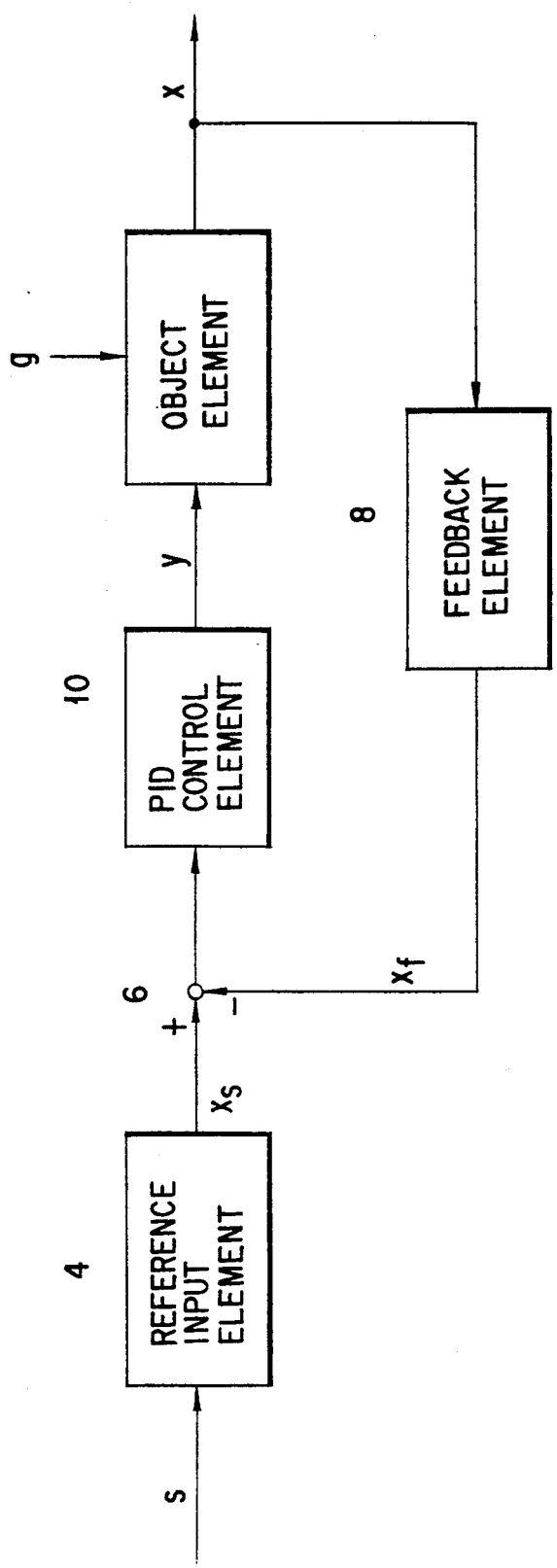
FIG. 1 is a block diagram illustrating the conventional PID control apparatus.

A preferred embodiment of a control apparatus according to the present invention will now be described with reference to the accompanying drawings. The present invention produces the operating signal $y_n$ based on the reference control signal $x_s$, the previous control signal $x_{n-1}$, and the previous operating signal $y_{n-1}$ in order to regulate the control speed so that hunting in the control system does not occur.

FIG. 2 is a block diagram illustrating a basic implementation of the present invention. A reference signal S of a control signal of an object element 12 is supplied to a reference input element 14. The element 14 supplies to a reference input signal $x_s$ to a control element 16. The control signal x output from the object element 12 is supplied to the control element 16 through a main feedback element 18, as a main feedback signal $x_f$. The control element 16 calculates an operating signal y in accordance with the principle of the present invention using the reference input signal $x_s$. The control element 16 also incorporates an automatic gain control calculation. The control signal x of the object element 12 is controlled by the operating signal y. The object element 12 is also supplied with a disturbance signal g. The operating signal y supplied to the object element 12 is supplied to the control element 16 through an auxiliary feedback element 20, as an auxiliary feedback signal $y_f$.

The present invention can be applied to any type of controls. Examples of the object elements 12 are as follows. In the steel industry, a rolling machine (pressure control, rapid acceleration control, reduction control, and plank control) and a process line (tension control and winding control) can be controlled according to the present invention. In an electric power supply, a nuclear reactor (neutron control and cooling water control), a dam (gate control and water level control), and an electric power plant (boiler control, burner control, turbine control, generator control with artificial intelligence and fuzzy inference, power ratio control, and frequency control) can be controlled according to the present invention. In a water plant, a water pipe system (pressure control, distribution control, chemical injection control, and pump control) and a sewer system (water quality control, oxygen value control, and antiwater pollution control) can be controlled according to the present invention. In a traffic system, a train (motor's torque control, speed control, and high efficiency control with artificial intelligence), an elevator (position control and velocity control), a road system (signal control and tunnel ventilator control), a car (fuel injection control, electric system control, and velocity control), and a commercial plane (landing control and fuel control with artificial intelligence and fuzzy inference) can be controlled according to the present invention. In general industrial settings, a pump and a blower system (pressure control, speed control, and flow control), a refrigerator (a pressure control, temperature control, capacity control, and anti-vibration control), a furnace system (temperature control with artificial intelligence and fuzzy inference), and an electric power source and an electric motor (inverter's current control, voltage control, and vector control) can be controlled according to the present invention. In a machinery, an industrial machine (speed control, torque control, and position control) and a robot (assembly robot control, welding robot control, and temperature control) can be controlled according to the present invention. In chemistry field, petrol chemical (distillatory control) and a reactor process (reactor speed control, distribution control, temperature control, pressure control, and injection control with artificial intelligence and fuzzy inference) can be controlled according to the present invention. In transportation and construction, an automatic warehouse (crane control, conveyor control, and ventilation control with fuzzy inference), a conveyor system (conveyor speed control, torque control, and robot-car control), a pipe line (pressure control and flow control), a construction machine (dump truck control, oil-pressure control, and excavator machine control), and a building (anti-earthquake control and air conditioning control with artificial intelligence and fuzzy inference) can be controlled according to the present invention. In home electronics, a washing machine (water flow control and cleanser control with fuzzy inference), a refrigerator and an air-conditioner (temperature-humidity-air flow control and high efficiency control with artificial intelligence and fuzzy inference), and an electric oven (time control with artificial intelligence) can be controlled according to the present invention. In a medical service industry, artificial heart surgery (heart pulse control with artificial intelligence), cancer treatment, (radioactivity control with artificial intelligence), and rehabilitation (simulator system control with artificial intelligence) can be controlled according to the present invention. In communications, a satellite (attitude control with artificial intelligence) a satellite tracking system (navigation system control), and a phased-allay antenna system and a multi-beam antenna system (landing (plane) control and object tracking control with artificial intelligence) can be controlled according to the present invention. In the military, munitions, and space, an aeroplane, a helicopter, and an STVOL plane (combat attitude control, propulsion power control, thrust direction control, auto pilot control, and fuel injection control with artificial intelligence), a missile and a torpedo (tracking control, sensor moving control, and air launch control with artificial intelligence), a tank (attitude and movement control and cannon drive control with artificial intelligence), and a combat simulator with artificial intelligence can be controlled according to the present invention.

The control element 12 produces the operating signal $y_n$ based on the sampling values of the two feedback signals $x_{n-1}$ and $y_{n-1}$ as follows:

$$y_n = \{\alpha(x_s - x_{n-1})/(x_{n-1} + \lambda) + 1\} \cdot y_{n-1} \tag{1a}$$

or $$y_n = \{\alpha(x_{n-1} - x_s)/(x_s + \lambda) + 1\} \cdot y_{n-1} \tag{1b}$$

where $y_n$: Next (indicated by suffix n) operating signal to be supplied to the object element 12

$y_{n-1}$: Current (indicated by suffix (n−1)) operating signal $x_s$: Reference control signal $x_{n-1}$: Current control signal (detected by means of a sensor included in the object element 12)

$\lambda$: Monotone convergence (without hunting) parametric constant (in general $\lambda = \pm x_{max}$, the polarity sign is determined in accordance with the characteristic of the object element 12)

$\alpha$: Convergence speed regulation (without overshoot) parametric constant ($1 \geq \alpha > 0$)

According to the present invention, the operating signal $y_n$ is calculated based on the two feedback signals $x_{n-1}$ and $y_{n-1}$ by properly setting the values of parametric constants $\alpha$ and $\lambda$ such that the control signal x and operating signal y are converged to the reference values $x_s$ and $y_s$ in a monotone manner. The values of the parametric constants $\alpha$ and $\lambda$ can be determined by using data obtained from a test operation of the control system where arbitrary initial values are set. Alternately, these values can be determined using a fuzzy inference system or a neural network during the actual operation of the control system where arbitrary initial values are set (for example, $\alpha = \frac{1}{2}$ and $\lambda = x_s$). As a result, these values can be determined in a real time manner during the control operation.

Figure 3:
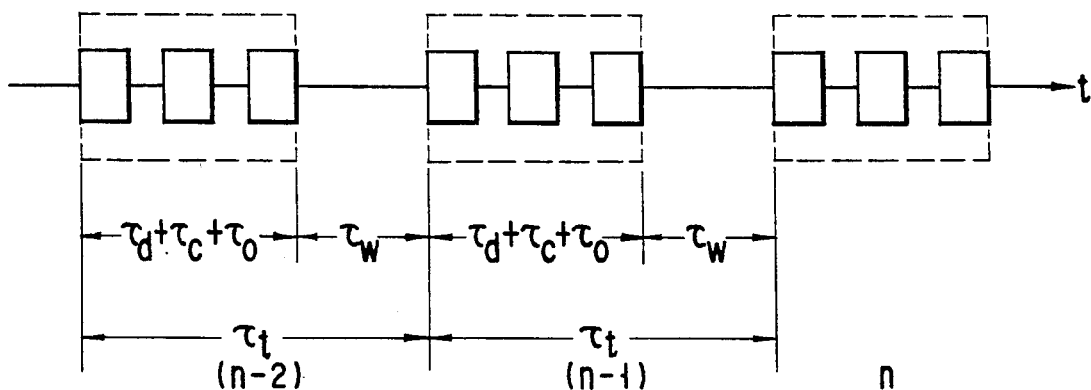
FIG. 3 illustrates the sampling control timings of the control signal and the operating signal of the present embodiment.

The present invention repeatedly performs the calculation of formula (1a) or (1b) until the convergence of the operating signal and the control signal is detected. The calculation is performed by an electronic processor. The necessary time cycle for the calculation is shown in FIG. 3. The significances of the symbols of FIG. 3 are as follows:

$\tau_d$: Sampling time of the input values $x_{n-1}$, $y_{n-1}$, $x_s$, $\alpha$, and $\lambda$ for the calculation $\tau_c$: Calculation time $\tau_o$: Calculation result output time $\tau_w$: Waiting time $\tau_t$: Time required for a sampling cycle (one sampling cycle time) ($= (\tau_d + \tau_c + \tau_o) + \tau_w$)

We will now describe in detail the technological principle which forms the basis for the derivation of formula (1a) or (1b).

A: Principle of the present invention.

In order to converge the control value x to the reference control value $x_s$ by controlling the operation signal y, it is required that the control signal x and operating signal y are simultaneously converged to the target point $P_s (x_s, y_s)$ without hunting in the shortest time period. The value $y_s$ is an unknown value of the operating signal which realizes $x = x_s$.

Most PID control apparatuses currently in use are designed on the premise that the hunting phenomenon is unavoidable. However, if the hunting phenomenon is generated at particularly high frequencies, the feedback loop may become a positive feedback loop, and as a result, the control system will oscillate or run away. In order to avoid this type of malfunction of the conventional PID control apparatus, it is thus necessary to incorporate a phase compensation circuit. However, the phase compensation circuit must be provided for the respective control objects, thereby lowering the generalization of the control system.

For the sake of simplicity, it is assumed that the physical values x and y have absolute units. In other words, it is assumed that they are falling in the first quadrant where $x \geq 0$ and $y \geq 0$.

Figure 4:
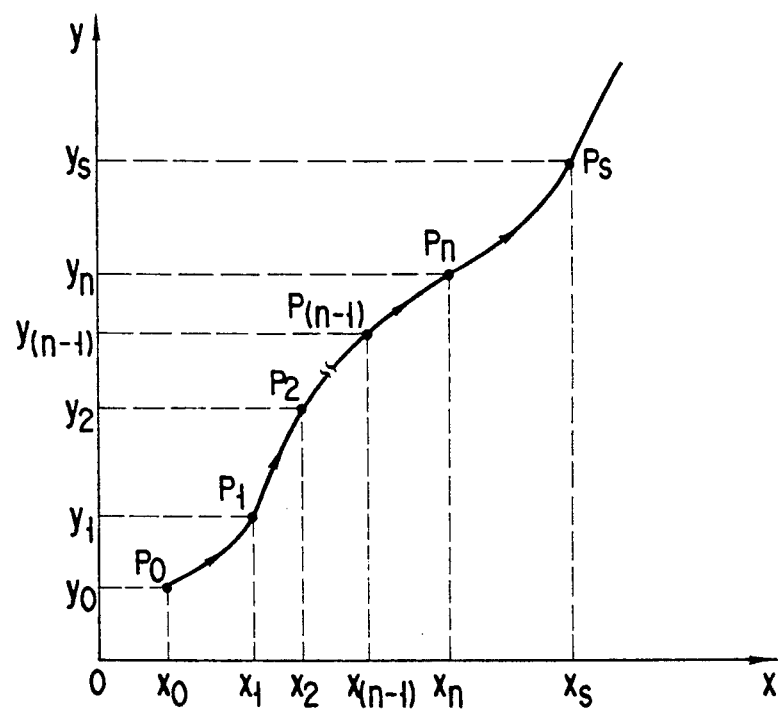
FIG. 4 illustrates a simultaneous convergence of the control signal and the operating signal which forms a basic principle of the present invention.

In FIG. 4, the characteristic curve $y = f(x)$ represents a relationship between x and y of the control object device under a predetermined external condition. The point $P_0 (x_0, y_0)$ is an initial condition and a point $P_{n-1} (x_{n-1}, y_{n-1})$ is the current operating point of the object under control.

The manner in which the operating signal $y_n$ and the control signal $x_n$ are simultaneously converged to the operating value $y_n$ and control value $x_n$ of the target point $P_s (x_s, y_s)$ is expressed as follows with reference to the curve shown in FIG. 4.

$$\lim_{n \to \infty} (x_s/x_n - y_s/y_n) = 0 \tag{2}$$

$$\lim_{n \to \infty} (x_s/x_n - y_n/y_s) = 0 \tag{3}$$

$$\lim_{n \to \infty} (x_s/y_s - x_n/y_n) = 0 \tag{4}$$

$$\lim_{n \to \infty} (x_s/y_s - y_n/x_n) = 0 \tag{5}$$

Formulae (2) to (5) can be modified into the following three formulae if the parameter n approaches the limit ($n \to \infty$).

$$y_s \delta(y_n/x_n) \cdot x_s = (x_s/x_n) \cdot y_n \tag{6}$$

$$y_s \delta(y_n/x_s) \cdot x_n = (x_n/x_s) \cdot y_n \tag{7}$$

$$y_s \delta(x_n/y_n) \cdot x_s = (x_n/x_s)/y_n \tag{8}$$

If a condition $y_n = y_s$ (or $x_n = x_s$) is introduced into formula (6) or (7), identity relationships $x_s = x_s$ and $y_s = y_s$ can always be obtained. Therefore, the existence of formulae (6) and (7) can be justified. In formula (8), however, a relationship $y_s = \pm x_s$ which can not be justified is obtained when the condition $y_n = y_s$ or $x_n = x_s$ is incorporated. Therefore, the formula (8) is discarded. Furthermore, if the relationship between x and y is either a direct proportion ($y = k1 \cdot x$) or an inverse proportion ($x \cdot y = k2$), then the approximation sign "s" in formulae (6) and (7) can be transformed into a full equality sign "=" as follows.

$$y_{i(n)} = (y_n/x_n) \cdot x_s = (x_n/x_s) \cdot y_n \tag{9}$$

$$y_{i(n)} = (y_n/x_s) \cdot x_n = (x_s/x_n) \cdot y_n \tag{10}$$

It can be assumed that there exists the above numerical sequence $y_{i(n)}$ for each control operation (sampling cycle n). If the control object can be controlled $$\left( \lim_{n\to\infty} x_n = x_s \text{ and } \lim_{n\to\infty} y_n = y_s \right).$$

formulae (9) and (10) can be rewritten as follows.

$$\lim_{n\to\infty} y_{i(n)} = \left( \lim_{n\to\infty} y_n / \lim_{n\to\infty} x_n \right) \cdot x_s = y_s \tag{9'}$$

$$\lim_{n\to\infty} y_{i(n)} = \left( \lim_{n\to\infty} y_n / x_s \right) \cdot \lim_{n\to\infty} x_n = y_s \tag{10'}$$

Hereinafter, the value $y_{i(n)}$ is called as a virtual convergence value. The introduction of the virtual convergence value is one of the key features of the present invention.

If the above formula (9) is seen from the point of view relating to the control operation using the operating value $y_n$ and control value $x_n$, the values $y_n$ and $x_n$ are directly proportional to each other and the relationship as denoted by formula (9) is hereinafter referred to as "direct characteristic". An example of the direct characteristic is shown in FIG. 5, in which y is the number of revolutions per unit time and x is the pressure in an air tank of an air compressor motor. Similarly, the values $y_n$ and $x_n$ can be inversely proportional to each other and this relationship denoted by formula (10) is hereinafter referred to as "inverse characteristic". An example of the inverse characteristic is shown in FIG. 6 in which y is the number of revolutions per unit time of a refrigerator motor and x is the pressure of a coolant in a refrigeration system.

Another key feature of the present invention is that a stable convergence condition (monotone convergence condition) is introduced. This condition means that the inequality $y_{i(n)} > y_{i(n-1)}$ or $y_{i(n)} < y_{i(n-1)}$ can be always satisfied during the control operation $$\left( \lim_{n\to\infty} y_{i(n)} = y_s \right).$$

This condition is denoted by the introduction of the parametric constant $\lambda$ into formula (1a) or (1b).

Figure 8:
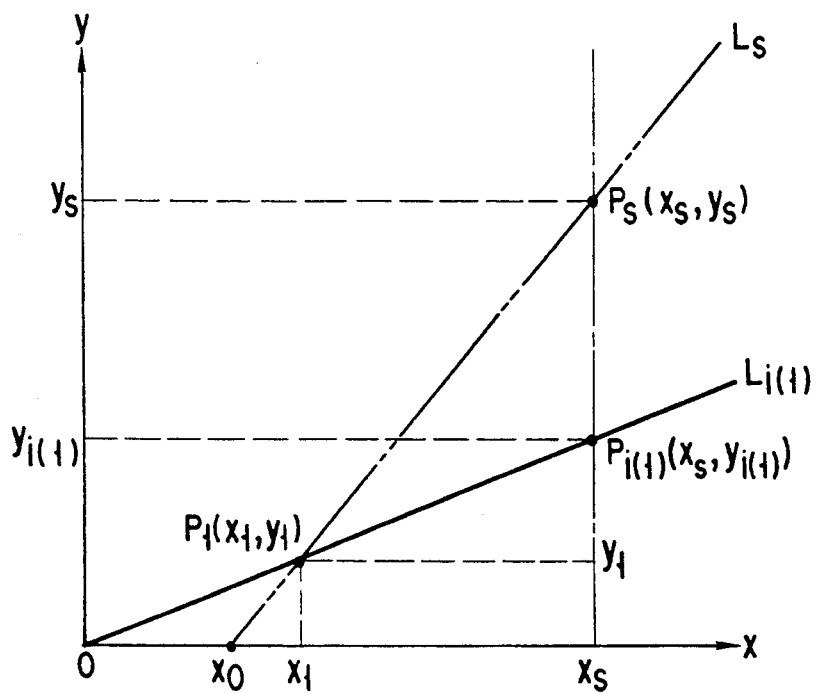
FIG. 8 shows the virtual convergence value $y_i(n)$ in the direct linear control system.

As will be described in more detail later, the monotone convergence condition is derived from a condition $|m_s| \geq |m_{i(\infty)}|$. As shown in FIG. 8, $m_s$ is the gradient $[dy/dx]x = x_s$ of the tangent of the control characteristic curve $y = f(x)$ at $x = x_s$ and $m_{i(\infty)}$ is the gradient of a virtual convergence line $L_{i(\infty)}$ which connects the origin point $P_O(0, 0)$ and the current point $P_n(x_n, y_n)$. The monotone convergence condition and the virtual convergence point or line are absent from a conventional control apparatus.

The description will now be given of the control operation for controlling a target device with a linear characteristic.

B-1: Example of a control system with a linear characteristic where the operating value y and the control value x are directly proportional to each other.

Figure 7:
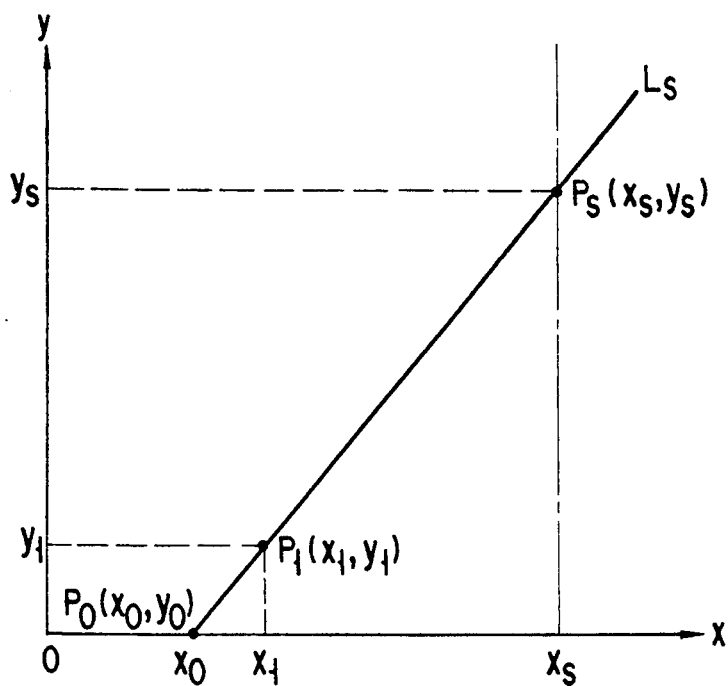
FIG. 7 shows a control system with the direct linear characteristic.

In FIG. 7, $x = x_0$ is the initial value (initial value) of the operating signal and $y = y_0 = 0$ is the initial condition of the control signal. $x = x_s$ is the reference control value, $x_{n-1}$ (n=2, 3, ...) is the control value sampled for each cycle and $y = y_s$ is the convergence value (unknown) of the control value y under the condition $x = x_s$. Since the control system has the linear characteristic, the control characteristic $y = f(x)$ can be expressed by a line $L_s$. The slope of the line $L_s$ is denoted by $m_s$ as follows:

$$L_s : y = m_s(x - x_s) \tag{11}$$

Formula (11) can be rewritten to generalize the relationship as follows:

$$m_s = [dy/dx]x = x_s \tag{12}$$

The control system has the linear characteristic having the direct proportion relationship, therefore, the virtual convergence value $y_{i(n)}$ takes the form of formula (9). Formula (9) can be rewritten as follows, if n is replaced with (n−1).

$$y_{i(n-1)} = (y_{n-1}/x_{n-1}) \cdot x_s \tag{13}$$

(n=2, 3, ...)

If the initial value $y = y_1$ of the operating signal is set to the system in order to operate the target device, the device will run and the control value $x = x_1$ is sampled or detected by a sensor (not shown). From formula (13), it can be understood that the point on the virtual convergence line $L_{i(1)}$ with the value of $y_{i(1)}$ lies on the line $x = x_s$ as shown in FIG. 8. It is also clear from FIG. 8 that triangles $\triangle OP_1x_1$ and $\triangle OP_{i(1)}x_s$ are similar to each other and therefore if n is set to 2 in formula (13), $y_{i(1)}$ can be expressed as the height $y = y_{i(1)}$ of the point $P_{i(1)}$ on line $x = x_s$. The straight line $OP_{i(n-1)}$ will be referred to as a virtual convergence line $L_{i(n-1)}$. The slope of the line $L_{i(n-1)}$ will be expressed by $m_{i(n-1)}$.

Based on the above description, the vertical convergence line $L_{i(1)}$ of FIG. 8 can be expressed as $y = m_{i(1)}x$. Since the point $P_1(x_1, y_1)$ lies on the line $y = m_s(x - x_0)$ and then $y_1 = m_s(x_1 - x_0)$, the $m_{i(1)}$ can be expressed as follows:

$$m_{i(1)} = y_1/x_1 = m_s(x_1 - x_0)/x_1 \tag{14}$$

In the direct linear characteristics, $x_1 > x_0 > 0$, therefore, $1 > (x_1 - x_0)/x_1 > 0$. From formula (14), the following relationship will be obtained.

$$m_s > m_{i(1)} \tag{15}$$

Figure 9:
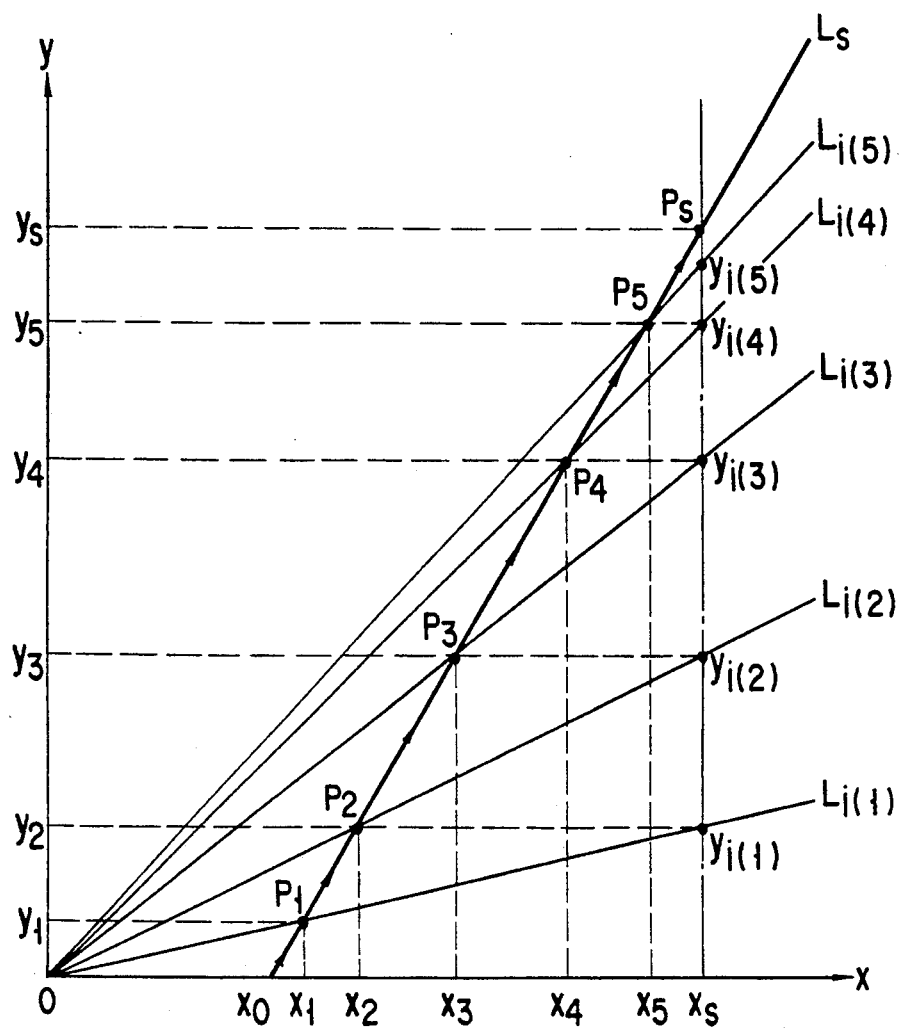
FIG. 9 illustrates the simultaneous convergence on a reference control point when the virtual convergence value $y_{i(n-1)}$ is set to the operating value $y_n$.

If such a control rule is determined that the next operating value $y_2$ is generated based on the value $y_{i(1)}$ of the virtual convergence value corresponding to the point $P_1(x_1, y_1)$ obtained from formula (13), the next operating point of the target device will be a point $P_2$ $(x_2, y_2)$. FIG. 9 illustrates the movement of the operating point of the target device in accordance with this rule. As can be seen from FIG. 9, the operating point $P_n(x_n, y_n)$ converges rapidly towards the target point $P_s(x_s, y_s)$ due to the control rule $y_{i(n-1)} = y_n$. In FIG. 9, the hunting phenomenon is also clearly absent. In other words, the operating point is converged to a point $P_n$ where the error is restricted within a range which is inherent in calculations utilizing an electronic processor, i.e., $P_n = P_s - \epsilon(0 < \epsilon << 1)$. The error can be ignored in a practical embodiment (in a 16 bit-machine, for example, the error would be in the order of approximately $-10^{-2}$ (%)). It will be clear from FIG. 8 that even if the control of the target device necessitates a particularly rapid rate of convergence the hunting phenomenon will not occur. This is because the condition that $m_s > m_{i(\infty)}$ is always established (see formula (15)).

If it is assumed that $n \to \infty$, the slope $m_{i(\infty)}$ of the virtual convergence line $L_{i(\infty)}$ is $m_{i(\infty)} = y_s/x_s = m_s(x_s - x_0)/x_s$ as seen from FIG. 9. The condition $x_s > x_0 \geq 0$ is established because of the direct proportional characteristic. Therefore, the relationships $1 \geq (x_s - x_0)/x_s > 0$ and $m_x > m_{i(\infty)}$ always established.

In the above description, it is assumed that there is no delay time for response. However, if there is a the response delay time TL inherent in the control system, the operating point $P_n$ may overshoot the target point $P_s$ in a rapid convergence operation, thereby causing hunting of the operating point around the target point. If, therefore, the control system has a delay time TL which is about one cycle time $\tau_t$ of the control operation, the hunting can be prevented by controlling the convergence speed as follows. In this control operation, a generalized expression of the algebraic mean (arithmetic mean) or geometric mean which is used in mathematics to guarantee a monotone convergence of a numerical sequence, is employed.

A generalized (extended) algebraic mean can be expressed as follows:

$$y_n = y_{n-1} + \alpha(y_{i(n-1)} - y_{n-1}) \quad (16)$$

where $1 \geq \alpha > 0$

Figure 10:
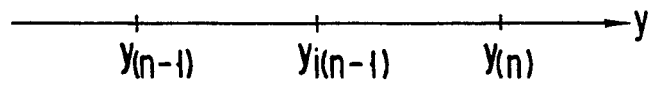
FIG. 10 shows the algebraic mean on a numerical value line.

If there are points $y_{n-1}$ and $y_{i(n-1)}$ ($y_{i(n-1)} > y_{n-1}$) on a numerical line y, as shown in FIG. 10, it is mathematically proven that the numerical sequence $\{y_n\}$ will converge towards the convergence point $y_s$ of the numerical sequence $y_{i(n-1)}$ in a monotone manner where the numerical sequence $y_{i(n-1)}$ is either a monotone increase sequence or a monotone decrease sequence.

The geometric mean is expressed as follows:

$$y_n = \sqrt{y_{i(n-1)} \cdot y_{n-1}}$$

If $$\lim_{n \to \infty} y_{i(n-1)} = y_s$$

in the geometric mean, then $$\lim_{n \to \infty} y_n = y_s.$$

This corresponds to the generalized algebraic mean formula (16) in which $$\alpha = \sqrt{y_{n-1}} / \sqrt{y_{i(n-1)} + y_{n-1}}.$$

Therefore, the geometric mean is included in the algebraic mean. In formula (16), when $\alpha = 1$, then $y_n = y_{i(n-1)}$, and it is clear that formulae (1a) and (1b) become as follows:

$$y_n = \{(x_s + \lambda)/(x_{n-1} + \lambda)\} \cdot y_{n-1} \quad (18a)$$

or $$y_n = \{(x_{n-1} + \lambda)/(x_s + \lambda)\} y_{n-1} \quad (18b)$$

It is thus possible to achieve a smooth control operation which is based on the monotone convergence by using formula (16) ($1 \geq \lambda > 0$) to control the convergence speed or, in other words, to synchronize the movement of the next operating value $y_n$ to be output with the steps of the operation to the change of the algebraic (or geometric) mean. We can thus obtain the following control calculation formula (19) from formulae (13) and (16).

$$y_n = \{a(x_s - x_{n-1})/x_{n-1} + 156 \cdot y_{n-1} \quad (19)$$

Formula (19) is identical to formula (1a) which forms the basis for the control method according to the present invention and which is equally applied to control systems having either linear or nonlinear, direct or inverse proportional characteristics.

B-2: Example of a control system with a linear characteristic where the operating value y and the control value x are inversely proportional to each other.

If the formula (10) is directly used as the operating signal in the inverse characteristic system, hunting of both the operating signal y and the control signal x will occur during the convergence process though the running point can converge towards the target point. The reason for the hunting is that the relationship $m_s < m_{i(n)}$ is always established in the inverse characteristic system. However, this hunting can be prevented and the control calculation formula (10) can be applied to the control system if the parametric constant $\lambda$ in formula (1a) or (1b) is introduced to formula (10) in order to realize a monotone convergence.

In case of an inverse linear characteristic, the virtual convergence value formula will take the form of formula (10). The formula (10) can be rewritten as follows by $n \to (n-1)$.

$$y_{i(n-1)} = (y_{n-1}/x_s) \cdot x_{n-1} \quad (20)$$

Figure 11:
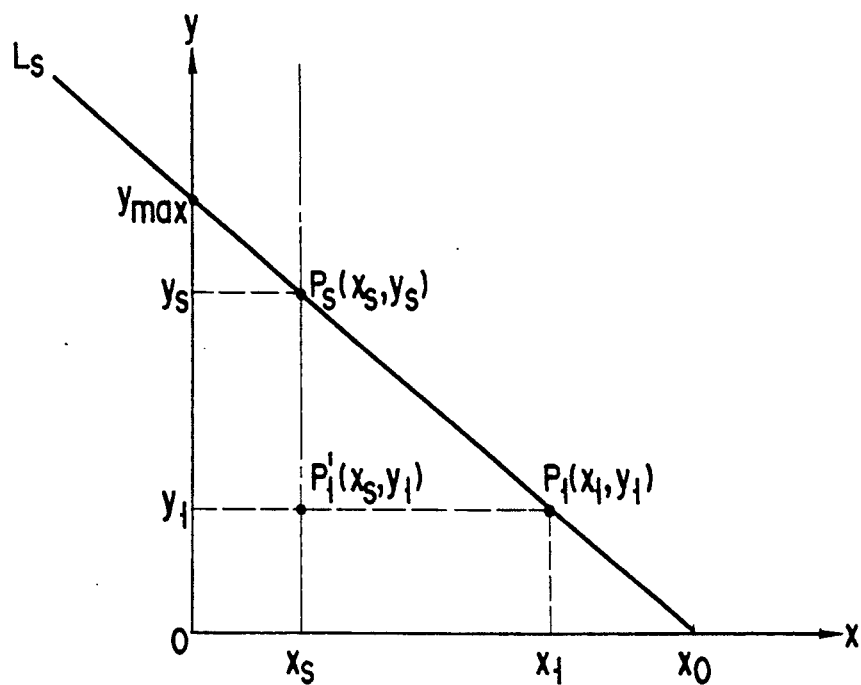
FIG. 11 shows a control system with an inverse linear response.
Figure 12:
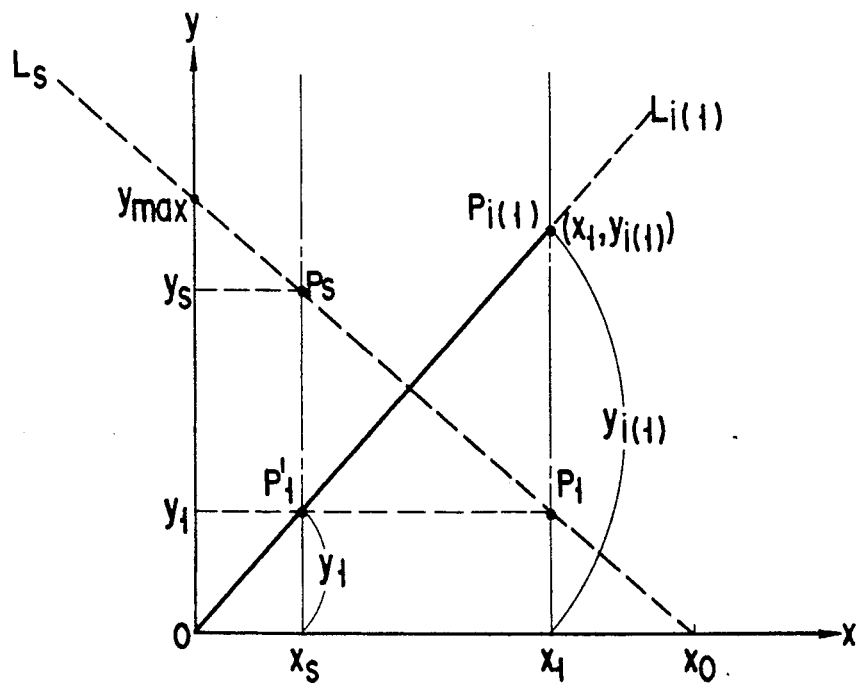
FIG. 12 illustrates the virtual convergence value $y_{i(n)}$ in the inverse linear control system.

If the target device is operated under the condition $y = y_1$, the control signal becomes $x = x_1$ as shown in FIG. 11. It can be seen from FIG. 12 that the value of $y_{i(1)}$ is located on the straight line $x = x_1$ according to formula (20). In other words, a triangle $\Delta OP_1'x_s$ is similar to a triangle $\Delta OP_{i(1)}x_1$ and thus formula (20) can be established. At the same time, the control characteristic line $L_s$ becomes: $y = m_s(x - x_0)$ and the virtual convergence value line $L_{i(1)}$ becomes: $y = m_{i(1)} \cdot x$ where $m_{i(1)} = y_1/x_s = m_s(x_1 - x_0)/x_s$. As the system has the inverse characteristic $x_0 > x_1 > x_s > 0$, $\therefore m_s = y_s/(x_s - x_0) < 0$. Therefore, $m_{i(1)} = y_1/m_s = m_s(x_1 - x_0)/x_s > 0$. In this way, $m_s < m_{i(n)}$ always holds true in control systems with inverse an linear characteristic.

Figure 13:
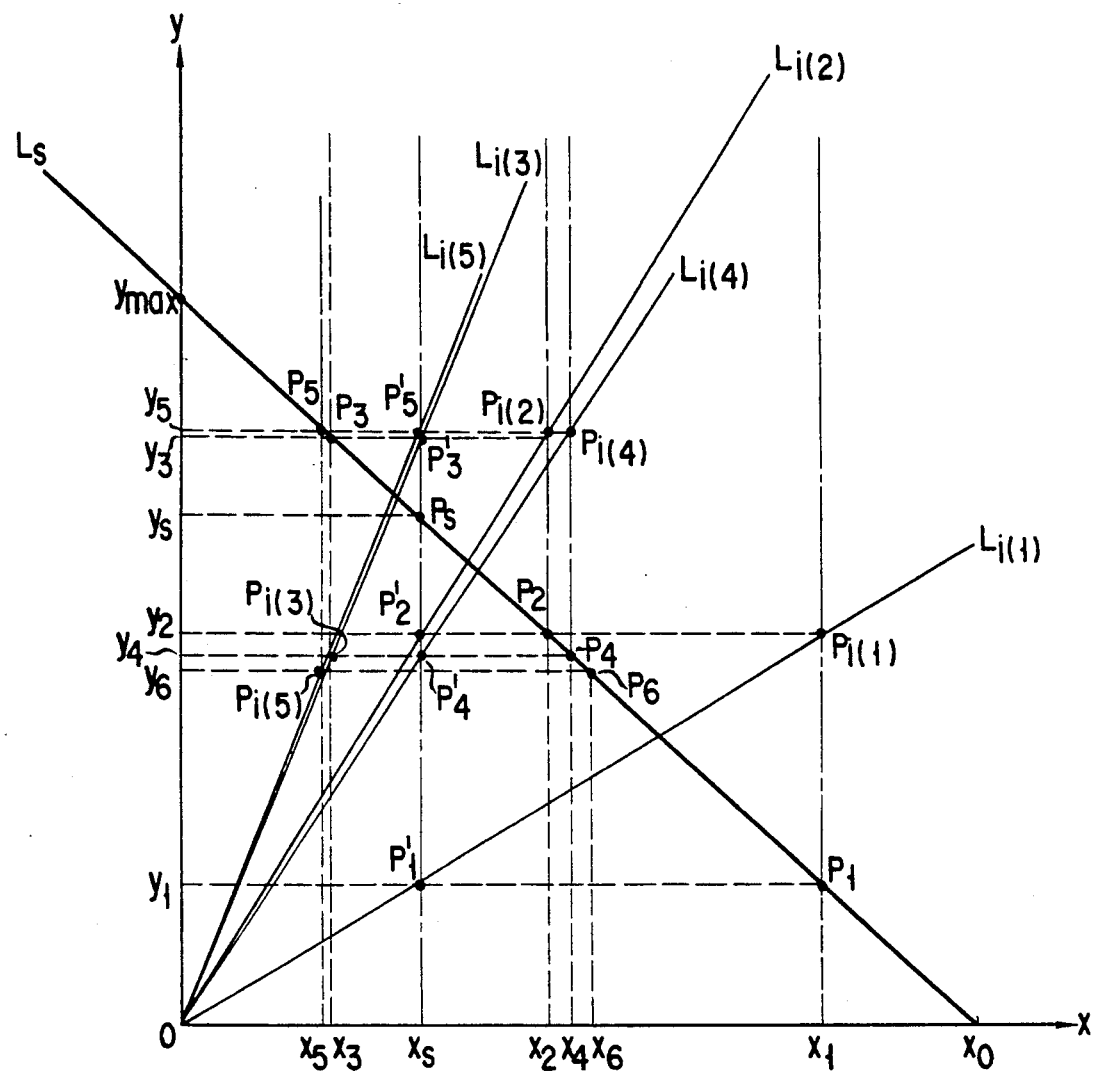
FIG. 13 illustrates the hunting phenomenon in the inverse linear control system where $y_{i(n-1)}g = y_n$.

If, in order to control operation, the virtual convergence value $y_{i(1)}$, which corresponds to the point $P_1(x_1, y_1)$ obtained in accordance with formula (20), is set as the next operating value y, the operating point of the system will move to a point $P_2(x_2, y_2)$. The movement of the operating point $P_n$ in accordance with the above control rule is illustrated in FIG. 13. As can be seen from FIG. 13, when n=4, a point $P_3$ has overshot the target point $P_s$ and hunting has already started. In other words, the occurrence of the hunting phenomenon in a control system with inverse linear characteristic depends on the location of the point $P_{i(n-1)}$ which determines the virtual convergence line $L_{i(n-1)}$. This is because $|m_s| < m_{i(n)}|$. There is no limiting condition applied to $m_{i(n)}$ which would result in $|m_{i(n)}| < |m_s|$. The techniques which are employed to achieve the monotone convergence towards the target point $P_s$ without hunting in a control system with the inverse linear characteristic must thus be described based on a view to establish a relationship $|m_{i(n)}| \leq |m_s|$. There are three different possibilities which could be considered and these are outlined below. Possibilities (i) and (ii) are based on the principle formula (10) of the convergence value $y_i$ and aim to create a situation where $|m_{i(n)}| \leq |m_s|$ and possibility (iii) is based on an analogy with the above section B-1 whereby the initial point of the virtual convergence value line is reset in order to establish a relationship $m_{i(n)} < m_s$.

(i): First technique for achieving convergence control in a control system with an inverse linear characteristic (The second technique (ii) is included as shown in the following).

Figure 14:
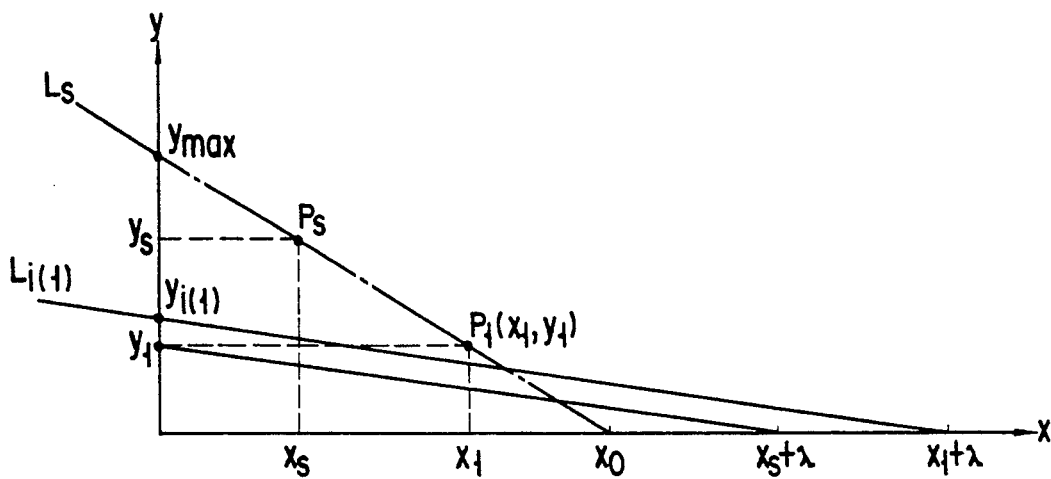
FIG. 14 shows the operating value $y_{i(1)}$ calculated in accordance with formula (21) using $x_s + \lambda$ and $x_1 + \lambda$.

It is clear from FIG. 13 that it is necessary to make the control values $x_n$ and $x_s$ greater than the initial value $x = x_0$ in order to make the slope $|m_{i(n)}|$ of the virtual convergence value line of a control system smaller than the slope $|m_s|$ of the control characteristic line and to prevent hunting. Following formula (21) can be obtained where $x_n \rightarrow x_n + \lambda$, and $x_s \rightarrow x_s + \lambda (\lambda > 0$, $x_n + \lambda > x_0$, and $x_s + \lambda \geq x_0$). FIG. 14 illustrates a situation where formula (21) is established.

$$y_{i(n-1)} = (y_{n-1}/(x_s+\lambda))\cdot(x_{n-1}+\lambda) \qquad (21)$$

FIG. 14 illustrates that the virtual convergence value $y_{i(1)}$ calculated in accordance with formula (21) is located on the straight line x=0.

Figure 15:
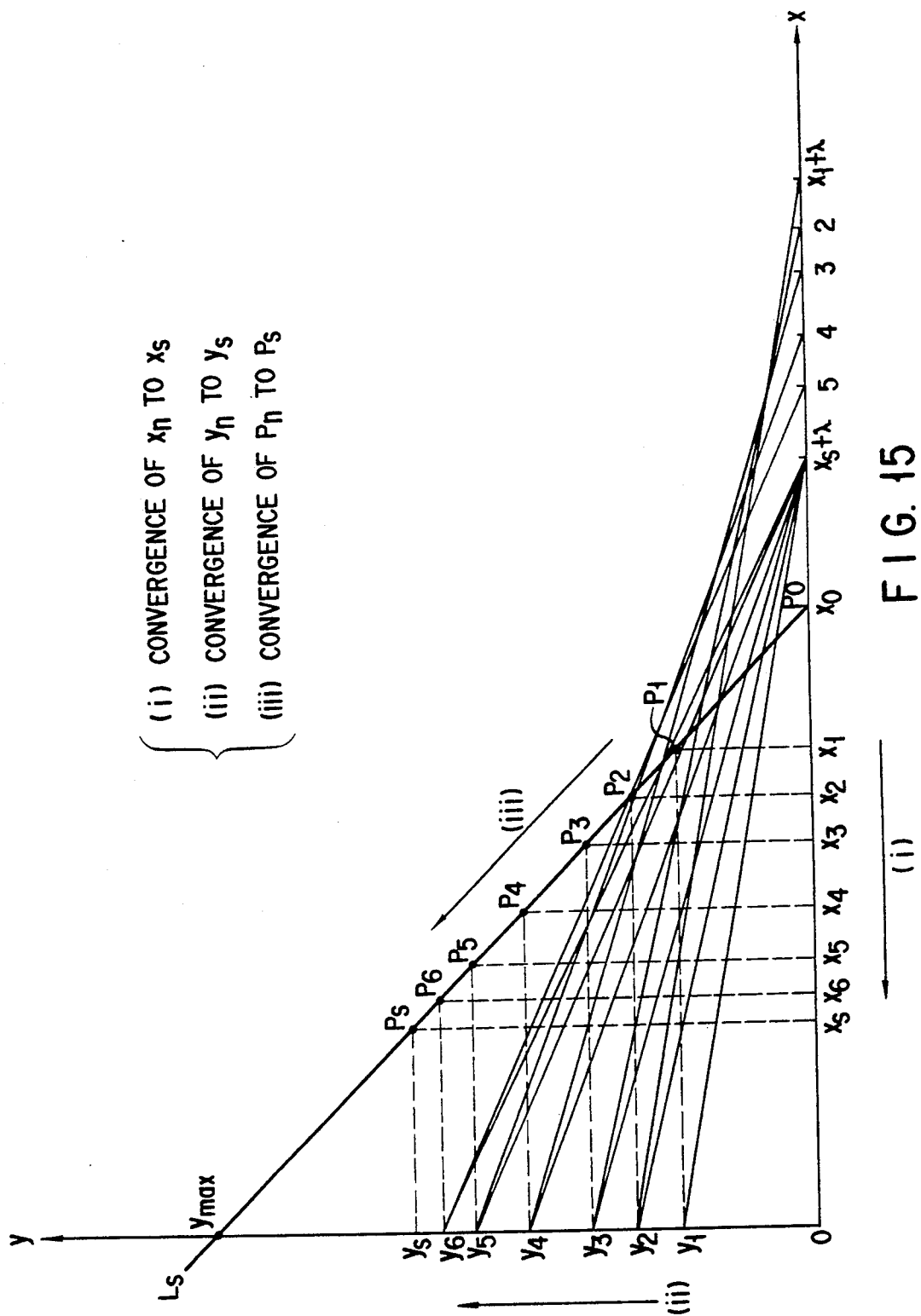
FIG. 15 illustrates a simultaneous convergence toward a point $P_s$ where $y_{i(n-1)} = y_n$.

In FIG. 14, a triangle $\Delta O(x_s+\lambda)y_1$ is similar to a triangle $\Delta O(x_1+\lambda)y_{i(1)}$ and, therefore, the value $y_{i(1)}$ is located on the straight line x=0. Since $|m_{i(1)}| = y_1/(x_s+\lambda) = (x_0-x_1)|m_s|/(x_s+\lambda)$ and $0 < (x_0-x_1)/(x_s+\lambda) < 1$, the relationship $|m_{i(1)}| < |m_s|$ can be always established. If the target device is controlled with $y_n = y_{i(n-1)}$, the operating point $P_n$ of the system is rapidly converged in a monotone manner towards the reference point $P_s$ without causing hunting, as shown in FIG. 15. The factor that makes such convergence possible is the fact that the parametric constant $\lambda$ is set such that $|m_{i(n)}| \leq |m_s|$ always holds. This is the first technique.

If the condition $|mi(n)| \leq |m_s|$ is mathematically examined, it is clear that if, as shown in FIG. 16, the target point $(x_s+\lambda)$ shown in FIG. 10 is reflexed with respect to the line $x = x_s$ and formula (21) is considered as a formula expressing the distance (positive value) between the lines, the monotone convergence can be always attained in a manner similar to the first technique. This is the second technique. Therefore, the formula (21) can be used in both the first and second techniques. As described above, it will be clear that if the formula (21) is used with the condition $\lambda \geq x_0$ for calculating the operating signal in a control system with an inverse linear characteristic, the condition $|m_{i(n)}| \leq |m_s|$ will be always obtained and the operating point can be converged in a monotone manner towards the target point $P_s$.

(iii): Third technique for achieving convergence control in a control system with an inverse linear characteristic.

The third technique (iii) is a modification using the description of the above section (B-1) in which the initial point is set as $\lambda \geq x_0$ and the point $y_{i(n)}$ is located on a line $x = x_s$. This technique represents a generalization of formula (13) and is shown in FIG. 17. FIG. 18 illustrates the monotone convergence of the operating point $P_n$ of the control system towards the target point $P_s$ without causing hunting under the condition $|m_{i(n)}| \leq |m_s|$. Using the parametric constant $\lambda$ and generalizing formula (13), the following formula is obtained:

$$y_{i(n-1)} = (y_{n-1}/(x_{n-1}+\lambda))\cdot(x_s+\lambda) \qquad (22)$$

$$\text{where } \lambda' = -\lambda \qquad (23)$$

If the triangle $\Delta\lambda P_1 x_1$ is similar to the triangle $\Delta\lambda P_1' x_s$, formula (22) shows that the point $y_{i(1)}$ is located on the line $x = x_3$.

Formula (22) can be established under the condition $\lambda' = -\lambda \geq -x_0$ (formula (24)).

As seen from FIG. 18, the operating point $P_n$ is rapidly converged in a monotone manner towards the point $P_s$ if the control calculation is made in accordance with formula (22). In an actual device, the operating value y and the control value x are limited as $y \leq y_{max}$ and $x \leq x_{max}$ and, therefore, the formula (22) can be applied for controlling all types of control devices if $\lambda = x_{max}$.

B-3: A summary of the monotone convergence conditions described in the above two sections B-1 and B-2.

It will now be clear from the above that the parametric constant $\lambda$ should be determined such that the slope condition $|m_{i(n)}| \leq |m_s|$ is established in order to converge the operating point $P_n$ towards the target point $P_s$ without hunting in a control system with a linear control characteristic line (with a slope $m_s$). If the next operating value is determined as $y_n = y_{i(n-1)}$, the operating point $P_n$ can be rapidly converted in a monotone manner towards the target point $P_s$.

Further, the convergence speed can be regulated by incorporating the extended algebraic mean $(y_n = y_{n-1} + \alpha(y_{i(n-1)} - y_{n-1})$, where $1 \geq \alpha > 0$) or the extended geometric mean $$(y_n = \sqrt{y_{i(n-1)} \cdot y_{n-1}}\ ).$$

The operating signal calculation formula for a control system having a direct linear characteristic is expressed as follows if the extended algebraic mean is used for regulating the convergence speed.

$$y_{i(n-1)} = \{y_{n-1}/(x_{n-1}+\lambda)\} \cdot (x_s+\lambda) \qquad (25a)$$

$$y_n = \alpha(y_{i(n-1)} - y_{n-1}) + y_{n-1}$$

$$\therefore y_n = \{\alpha(x_s - x_{n-1})/(x_{n-1}+\lambda) + 1\} \cdot y_{n-1}$$

$$\text{where } 1 \geq \alpha > 0, \lambda > x_0$$

The operating signal calculation formula for a control system having an inverse linear characteristic is expressed as follows if the extended geometric mean is used for regulating the convergence speed.

$$y_{i(n-1)} = \{y_{n-1}/(x_{n-1} + \lambda)\} \cdot (x_s + \lambda) \quad (25b)$$

$$y_n = \sqrt{y_{i(n-1)} \cdot y_{n-1}}$$

$$\therefore y_n = y_{n-1} \cdot \sqrt{(x_s + \lambda)/(x_{n-1} + \lambda)}$$

The operating signal calculation formula for a control system having a direct linear characteristic is expressed as follows if the extended algebraic mean is used for regulating the convergence speed.

$$y_{i(n-1)} = \{y_{n-1}/(x_s + \lambda)\} \cdot (x_{n-1} + \lambda) \quad (26a)$$

$$y_n = \alpha(y_{i(n-1)} - y_{n-1}) + y_{n-1}$$

$$\therefore y_n = \{\alpha(x_{n-1} - x_s)/(x_s + \lambda) + 1\} \cdot y_{n-1}$$

where $1 \geq \alpha > 0, \lambda > x_0 - x_s$

The operating signal calculation formula for a control system having an inverse linear characteristic is expressed as follows if the extended geometric mean is used for regulating the convergence speed.

$$y_{i(n-1)} = \{y_{n-1}/(x_{n-1} + \lambda)\} \cdot (x_s + \lambda) \quad (26b)$$

$$y_n = \sqrt{y_{i(n-1)} \cdot y_{n-1}}$$

$$\therefore y_n = y_{n-1} \cdot \sqrt{(x_{n-1} + \lambda)/(x_s + \lambda)}$$

It is clear from the above description that formulae (25a), (25b), (26a), and (26b) can be selectively used for calculating the control values for the constant value control and the follow-up control where the characteristic of the control system, e.g., the direct or inverse characteristic is known. These formulae can also be used for a nonlinear system as follows where the nonlinear characteristic is approximated in linear segment by linear segment.

C: Examples of a control operation according to the present invention for controlling the system with the nonlinear characteristic.

In this section, the description will be given with reference to the application of formulae (25a) and (26b). An example based on formula (26a) has been omitted since there is little difference in practice between the calculation based on formula (26a) and the calculation based on formula (26b).

C-1: First example for controlling the nonlinear system with the direct characteristic.

The operating value calculating formula is obtained as follows in accordance with formula (25a) where $\lambda = 0$ and $\alpha = \frac{1}{2}$.

$$y_n = \{(x_s + x_{n-1})/2x_{n-1}\} \cdot y_{n-1} \quad (28)$$

where $y_1 \ll y_{max}$

Figure 19:
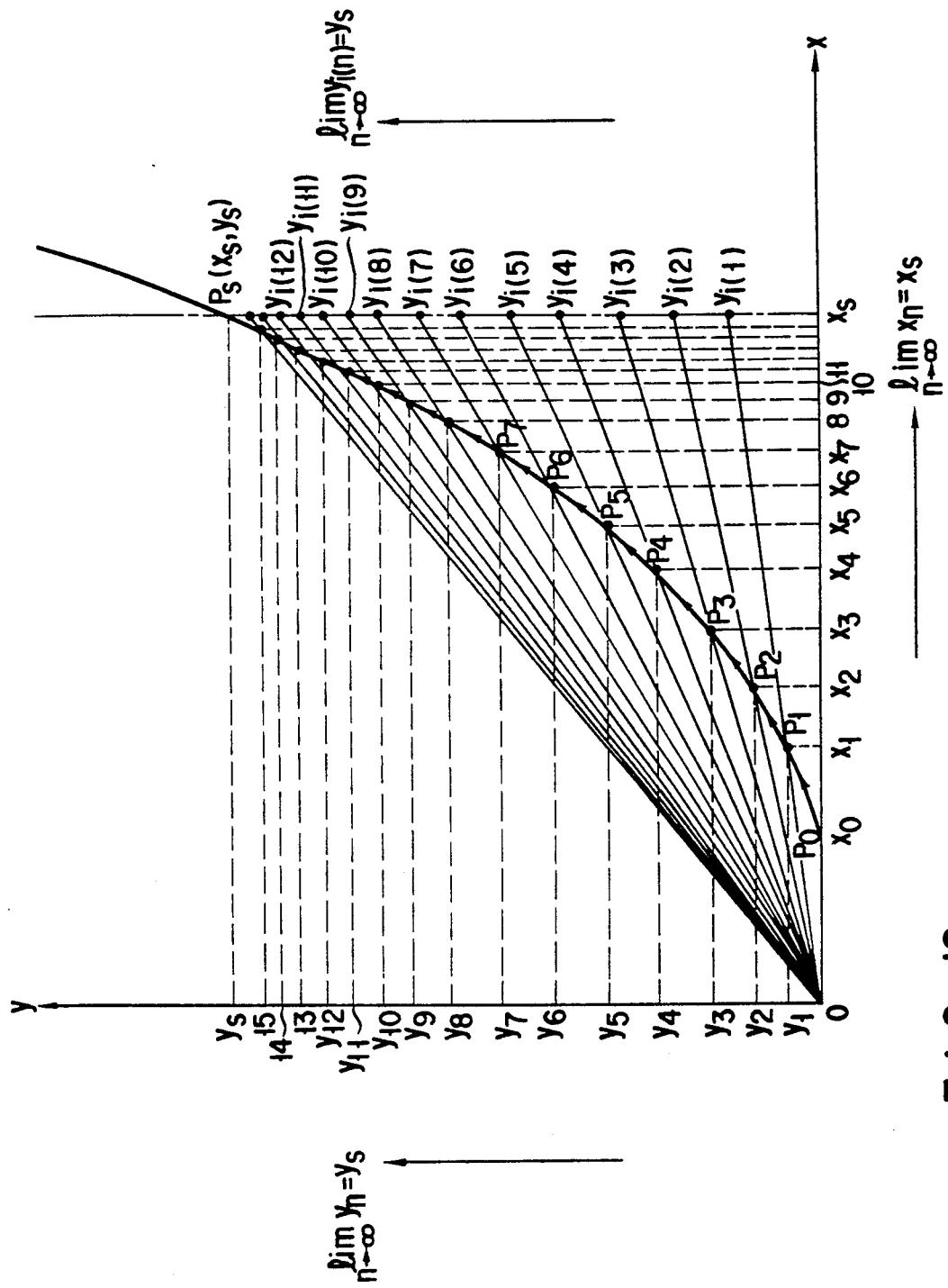
FIG. 19 illustrates an example of the control characteristic of the control system with a direct nonlinear characteristic.

As can be seen from FIG. 19, signals $x_n$, $y_n$, and $y_{i(n)}$ are converged to the point $P_s$ at the same time. Stated another way, the gain of the control system is automatically controlled so as to control the convergence speed of the system. Therefore, the hunting phenomenon due to inappropriate values of the gain constants, integral time constants, and differential time constants in the conventional control system can be completely prevented according to the present technique. FIG. 19 is designed to illustrate the technique of constant control. It is nevertheless clear from FIG. 19 that even if the value of $x_s$ does not remain constant during a control operation, a proper gain and a proper convergence speed are set in accordance with the values $x_{n-1}$ and $y_{n-1}$ according to the present invention and, therefore, the follow-up control is performed for maintaining the stability of the system and preventing the occurrence of hunting which is generated by mutual interference resulting from the simultaneous integral and differential action encountered in the conventional PID control system.

C-2: Second example for controlling the nonlinear system with the direct characteristic.

Figure 20:
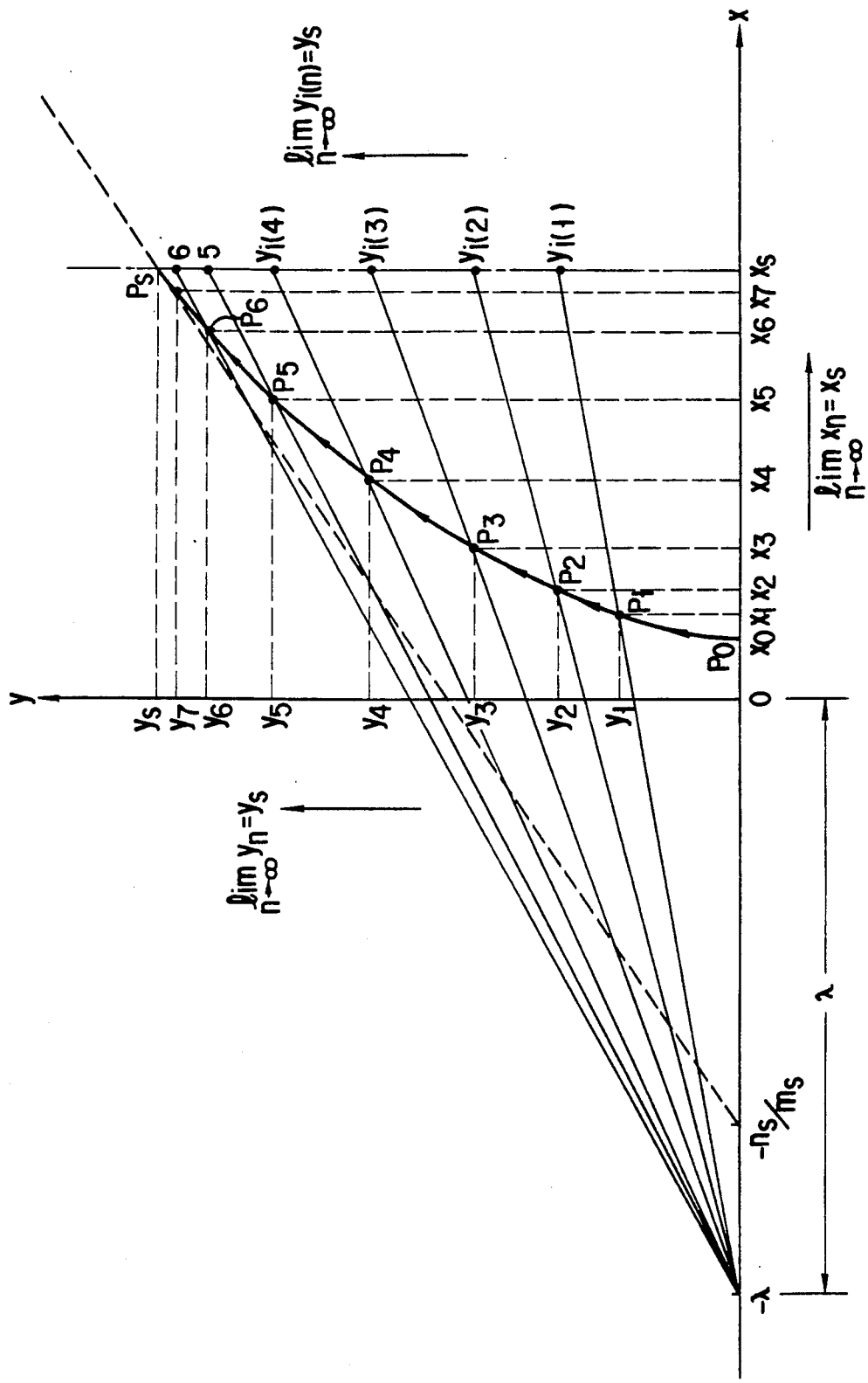
FIG. 20 illustrates another example of the control characteristic of the control system with a direct nonlinear characteristic.

FIG. 20 shows the convergence of the operating point $P_n$ wherein the value of $\lambda$ is determined by means of an operating test of the system as $|m_{i(n)}| < |m_s|$.

Figure 21:
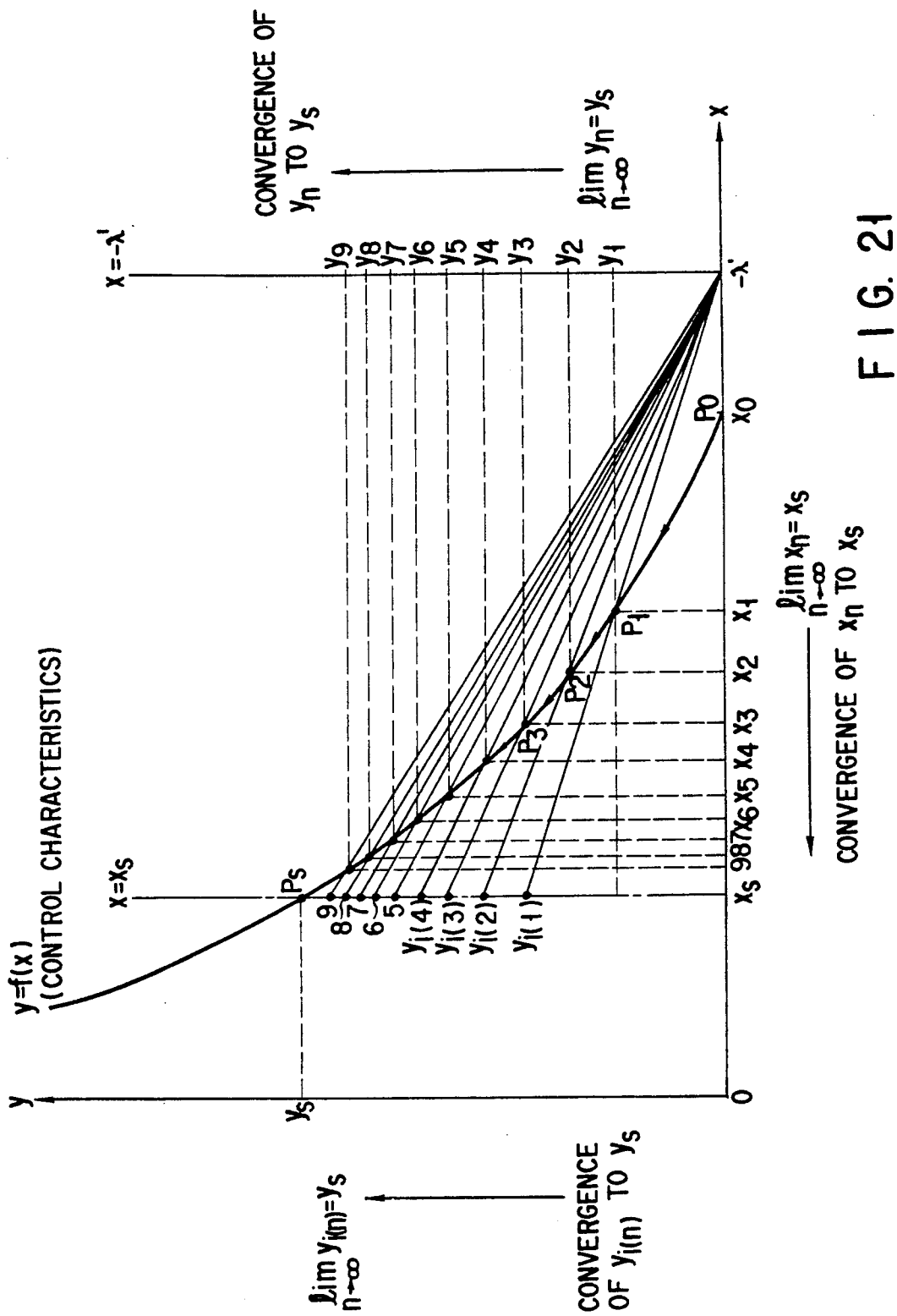
FIG. 21 illustrates an example of the control characteristic of the control system with an inverse nonlinear characteristic.

C-3: First example for controlling the nonlinear system with the inverse characteristic (FIG. 21).

The operating value calculating formula is obtained as follows in accordance with formula (26a) where $\lambda' = x_0$ and $\alpha = \frac{1}{2}$.

$$y_n = \{0.5(x_s - x_{n-1})/(x_{n-1} - 6x_0/5) + 1\} \cdot y_{n-1} \quad (29)$$

where $\lambda' = -6x_0/5$

C-4: Second example for controlling the nonlinear system with the inverse characteristic (FIG. 22).

The operating value calculating formula is obtained as follows where $\alpha = 1$.

$$y_n = \{(x_s - x_{n-1})/(x_{n-1} - \lambda') + 1\} \cdot y_{n-1} \quad (30)$$

Figure 22:
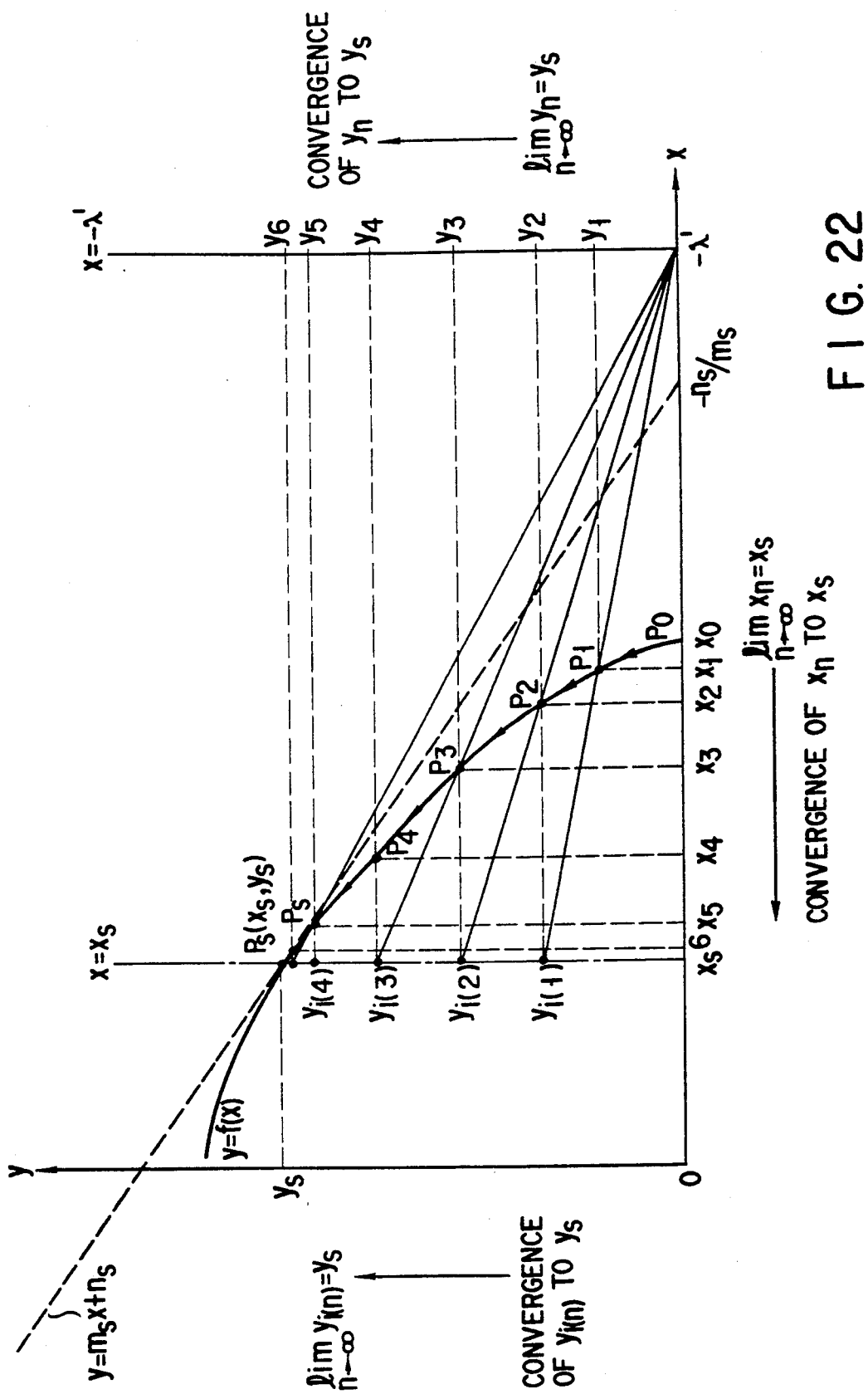
FIG. 22 illustrates another example of the control characteristic of the control system with an inverse nonlinear characteristic.

FIG. 22 shows the convergence of the operating point $P_n$ based on formula (30) wherein the value of $\lambda'$ is determined by means of an operating test of the system. The value of $\alpha$ has been set to $\alpha = 1$ which is the most appropriate value for use in calculating operating values for a control device with a small delay time.

According to the present invention, there is provided a control apparatus in which the next operating signal is determined in accordance with the virtual convergence line, thereby enabling the rapid convergence without causing hunting. The convergence speed is controlled in accordance with the reference control value $x_s$, the current control value $x_{n-1}$, and the current operating value $y_{n-1}$ such that hunting does not occur in the control system. The present invention has a feature that the parametric constants and convergence speed can be simply and easily set by performing an operating test of the system for several times.

What is claimed is:

1. A control apparatus for a mechanical device, comprising:
   reference input means for receiving a reference input signal;
   control means connected to said reference input means and the mechanical device for controlling the mechanical device;
   main feedback means for detecting a control signal output from said mechanical device and supplying said control signal to said control means as a main feedback signal; and
   auxiliary feedback means for detecting an output signal from said control means and outputting said control signal to said control means as an auxiliary feedback signal, wherein said control means uses a following formula to obtain the operating signal when the mechanical device has a proportional characteristic between the operating signal and the control signal:

$$y_n = \{(x_s - x_{n-1})/(x_{n-1} + \lambda) + 1\} \cdot y_{n-1}$$

where $y_n$: the operating signal to be supplied to the mechanical device
$y_{n-1}$: the auxiliary feedback signal
$x_s$: the reference input signal
$x_{n-1}$: the main feedback signal
$\alpha$: a regulation speed regulation parametric constant ($1 \geq \alpha > 0$)
$\lambda$: a monotone convergence regulation parametric constant.

2. A control apparatus for a mechanical device, comprising:

reference input means for receiving a reference input signal;

control means connected to said reference input means and the mechanical device for controlling the mechanical device;

main feedback means for detecting a control signal output from said mechanical device and supplying said control signal to said control means as a main feedback signal; and auxiliary feedback means for detecting an output signal from said control means and outputting said control signal to said control means as an auxiliary feedback signal, wherein said control means uses a following formula to obtain the operating signal when the mechanical device has a proportional characteristic between the operating signal and the control signal:

$$y_n = y_{n-1} \cdot \sqrt{(x_s + \lambda)/(x_{n-1} + \alpha)}$$

where $y_n$: the operating signal to be supplied to the mechanical device
$y_{n-1}$: the auxiliary feedback signal
$x_s$: the reference input signal
$x_{n-1}$: the main feedback signal
$\alpha$: a regulation speed regulation parametric constant ($1 \geq \alpha > 0$)
$\lambda$: a monotone convergence regulation parametric constant.

3. A control apparatus for a mechanical device, comprising:

reference input means for receiving a reference input signal;

control means connected to said reference input means and the mechanical device for controlling the mechanical device;

main feedback means for detecting a control signal output from said mechanical device and supplying said control signal to said control means as a main feedback signal; and auxiliary feedback means for detecting an output signal from said control means and outputting said control signal to said control means as an auxiliary feedback signal, wherein said control means uses a following formula to obtain the operating signal when the mechanical device has an inverse proportional characteristic between the operating signal and the control signal:

$$y_n = \{\alpha(x_{n-1} - x_s)/(x_s + \lambda) + 1\} \cdot y_{n-1}$$

where $y_n$: the operating signal to be supplied to the mechanical device
$y_{n-1}$: the auxiliary feedback signal
$x_s$: the reference input signal
$x_{n-1}$: the main feedback signal
$\alpha$: a regulation speed regulation parametric constant ($1 \geq \alpha > 0$)
$\lambda$: a monotone convergence regulation parametric constant.

4. A control apparatus for a mechanical device, comprising:

reference input means for receiving a reference input signal;

control means connected to said reference input means and the mechanical device for controlling the mechanical device;

main feedback means for detecting a control signal output from said mechanical device and supplying said control signal to said control means as a main feedback signal; and auxiliary feedback means for detecting an output signal from said control means and outputting said control signal to said control means as an auxiliary feedback signal, wherein said control means uses a following formula to obtain the operating signal when the mechanical device has an inverse proportional characteristic between the operating signal and the control signal:

$$y_n = y_{n-1} \cdot \sqrt{(x_{n-1} + \lambda)/(x_s + \alpha)}$$

where $y_n$: the operating signal to be supplied to the mechanical device
$y_{n-1}$: the auxiliary feedback signal
$x_s$: the reference input signal
$x_{n-1}$: the main feedback signal
$\alpha$: a regulation speed regulation parametric constant ($1 \geq \alpha > 0$)
$\lambda$: a monotone convergence regulation parametric constant.

* * * * *

UNITED STATES PATENT AND TRADEMARK OFFICE
CERTIFICATE OF CORRECTION

PATENT NO. : 5,291,390

DATED : March 1, 1994

INVENTOR(S) : Nobuyasu Satou

Page 1 of 2

It is certified that error appears in the above-indentified patent and that said Letters Patent is hereby corrected as shown below:

| Column | Line | |
|---|---|---|
| 1 | 50 | After "because" delete "that". |
| 2 | 53 | Change "yi(n)" to --$y_{i(n)}$--. |
| 3 | 39 | After "supplies" delete "to". |
| 4 | 3 | Change "antiwater pollution control)" to --water pollution control)--. |
| 4 | 21 | Before "machinery" delete "a". |
| 4 | 25 | After "In" insert --the--. |
| 4 | 48 | Before "medical" change "a" to --the--. |
| 4 | 56 | Change "phased-allay" to --phased-array-- |
| 6 | 46 | Change "$y_s \delta$ (..." to --$y_s \cong$ (...--. |
| 6 | 48 | Change "$y_s \delta$ (..." to --$y_s \cong$ (...--. |
| 6 | 50 | Change "$y_s \delta$ (..." to --$y_s \cong$ (...--. |
| 6 | 60 | Change "(y=k1·x) to --(y=k1·x)--. |
| 6 | 61 | Change "(x·y=k2)" to --(x·y=k2)--. |
| 6 | 61 | Change "sign "s" in" to --sign "$\cong$" in--. |

UNITED STATES PATENT AND TRADEMARK OFFICE
CERTIFICATE OF CORRECTION

PATENT NO. : 5,291,390
DATED : March 1, 1994
INVENTOR(S) : Nobuyasu Satou

It is certified that error appears in the above-indentified patent and that said Letters Patent is hereby corrected as shown below:

| Column | Line | |
|--------|------|---|
| 7  | 62 | Change "$P_0$ (0,0)" to --$P_0$ (0,0)--. |
| 8  | 12 | Change "line Ls" to --line $L_s$--. |
| 8  | 15 | Change "$L_s \cdot y = \ldots$" to --$L_s: y = \ldots$--. |
| 8  | 32 | Change "set" to --sent--. |
| 10 | 21 | Change "$\ldots + 156 \cdot y_{n-1}$" to --$\ldots 1\} \cdot y_{n-1}$--. |
| 10 | 63 | Change "inverse an" to --an inverse--. |
| 10 | 64 | After "control" insert --the--. |
| 11 | 9  | Change "$\|m_s\| < m_{i(n)}\|$" to --$\|m_s\| < \|m_{i(n)}\|$--. |
| 12 | 44 | Change "converted" to --converged--. |
| 14 | 45 | Before "rapid" delete "the". |
| 15 | 7  | Change "$y_n = \{(\ldots$" to --$y_n = \{\alpha (\ldots$--. |

Signed and Sealed this

Sixth Day of September, 1994

Attest:

BRUCE LEHMAN

Attesting Officer  Commissioner of Patents and Trademarks